(No Model.) 5 Sheets—Sheet 1.
N. NEWMAN.
CASH CARRIER.
No. 455,349. Patented July 7, 1891.
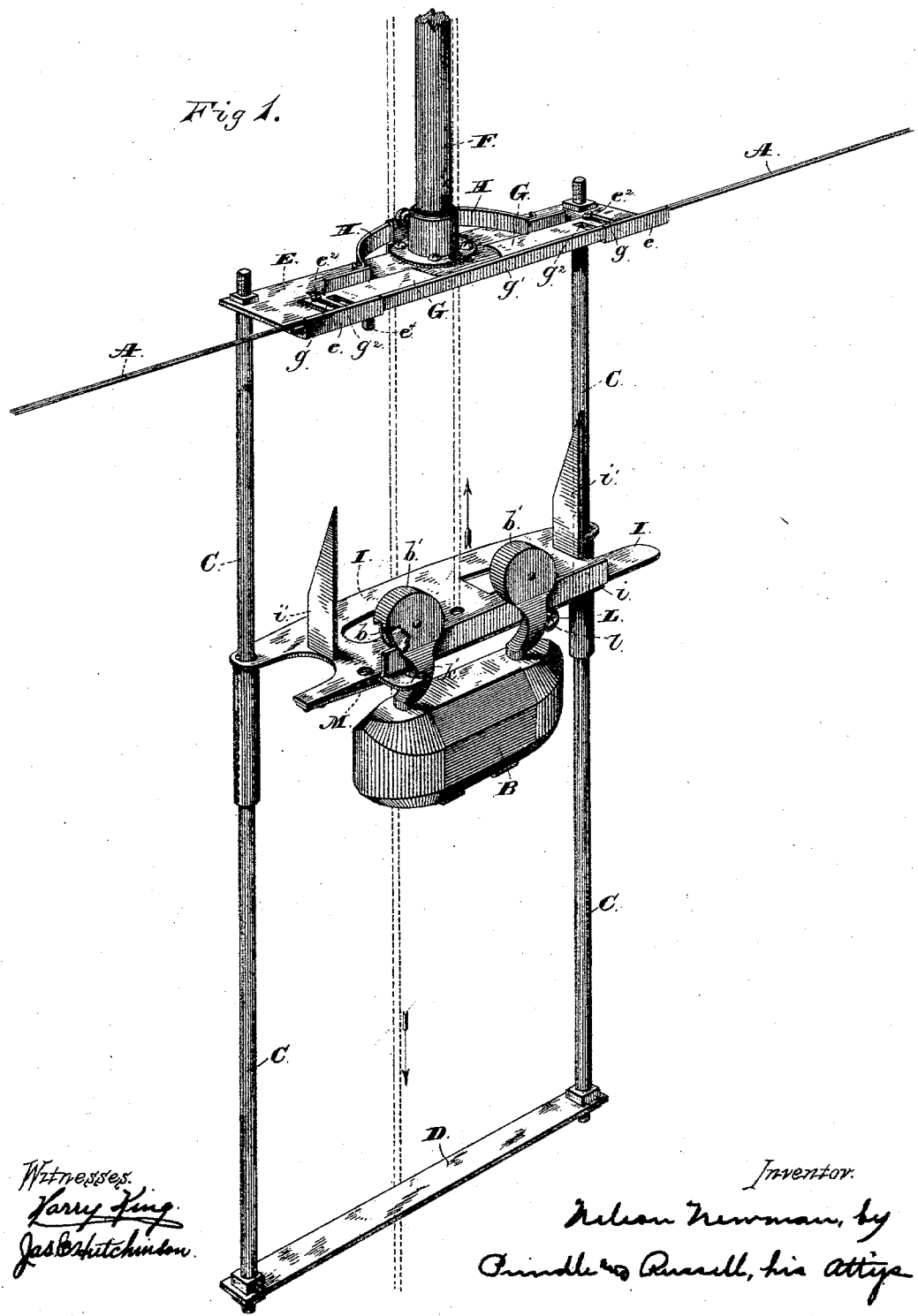

(No Model.) 5 Sheets—Sheet 2.
N. NEWMAN.
CASH CARRIER.
No. 455,349. Patented July 7, 1891.
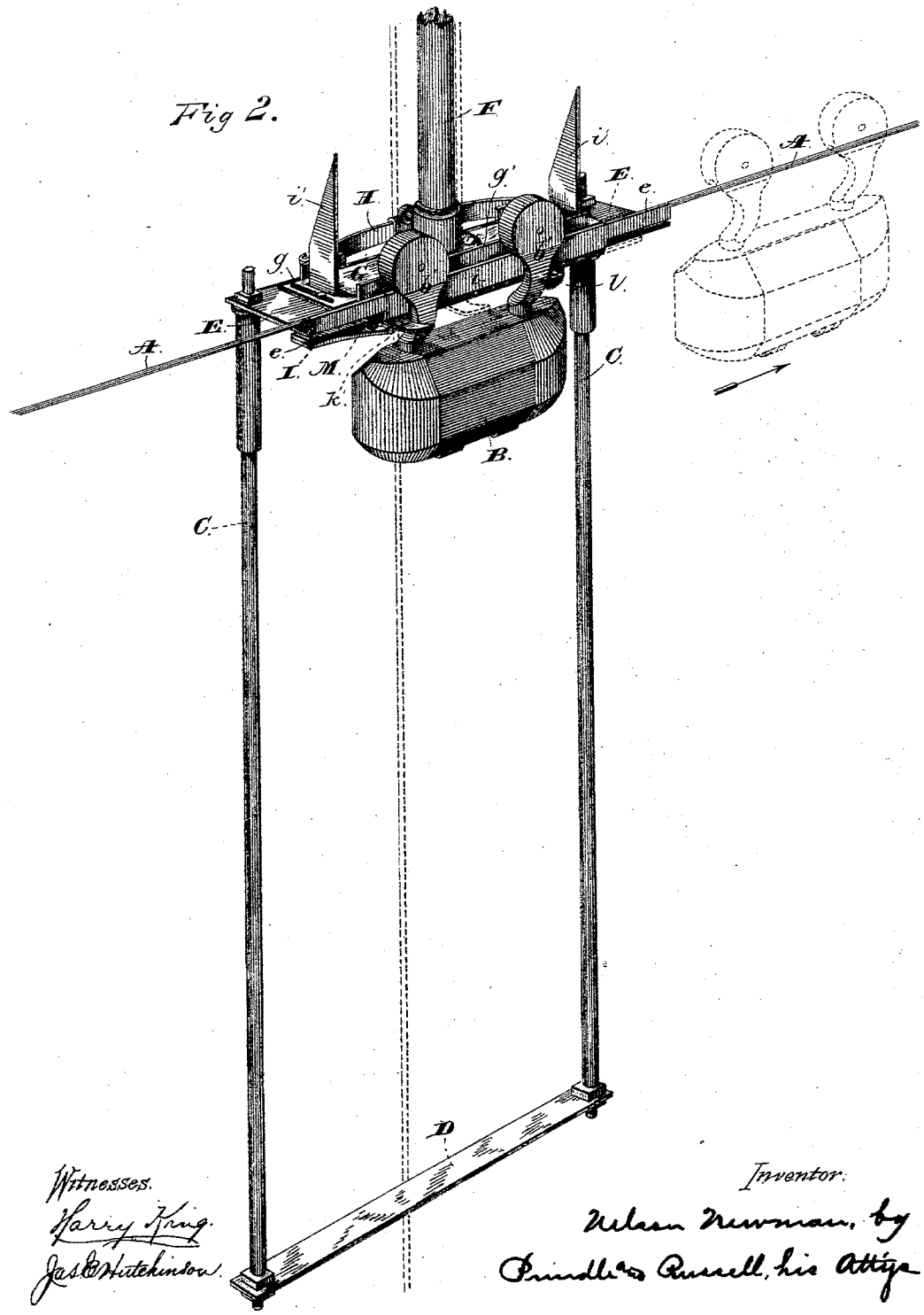

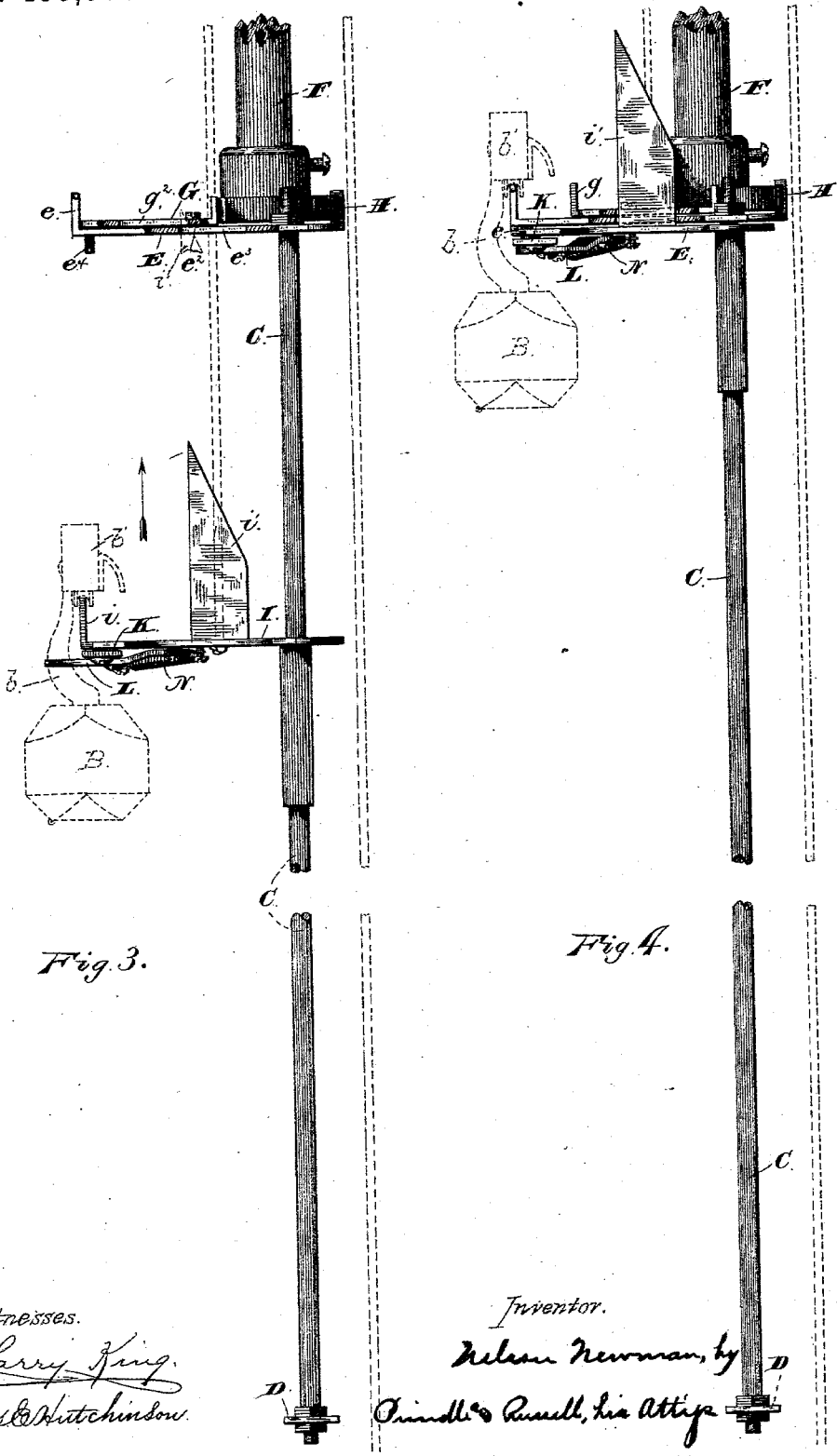

(No Model.)  
5 Sheets—Sheet 4.
N. NEWMAN.
CASH CARRIER.
No. 455,349. Patented July 7, 1891.
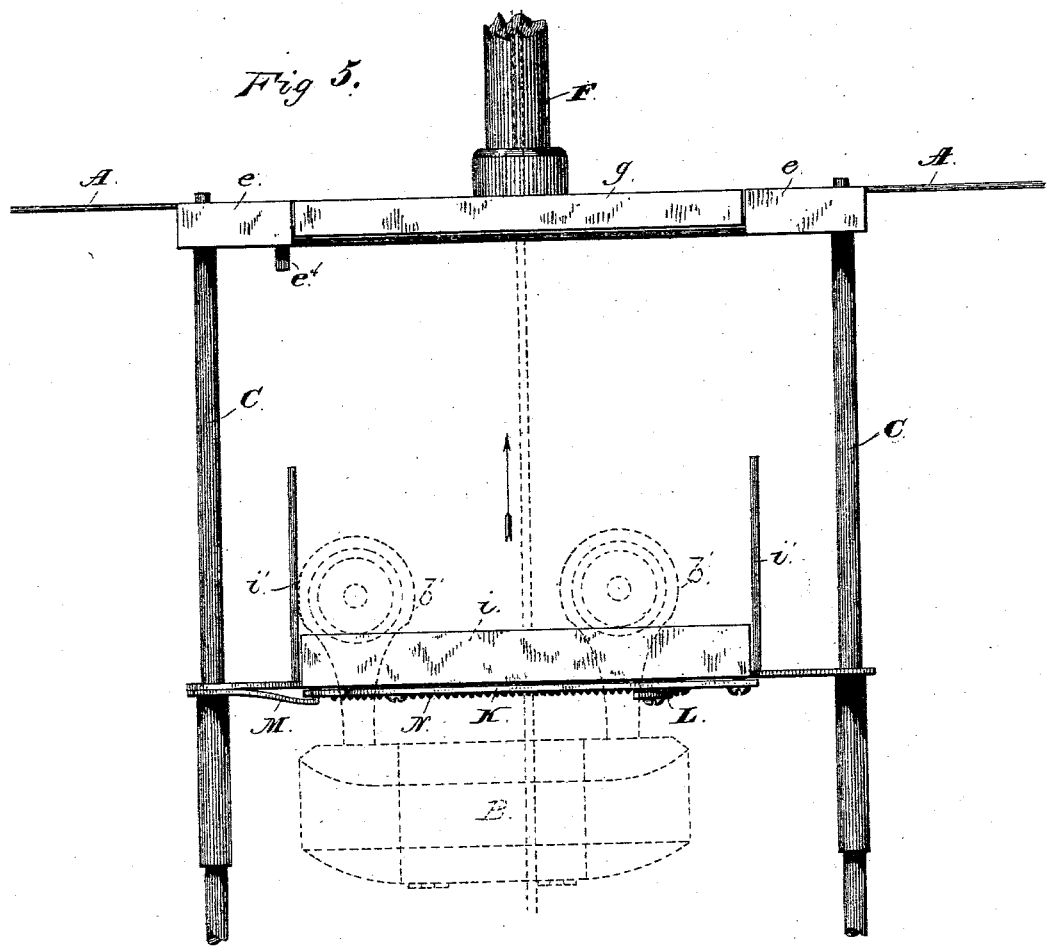
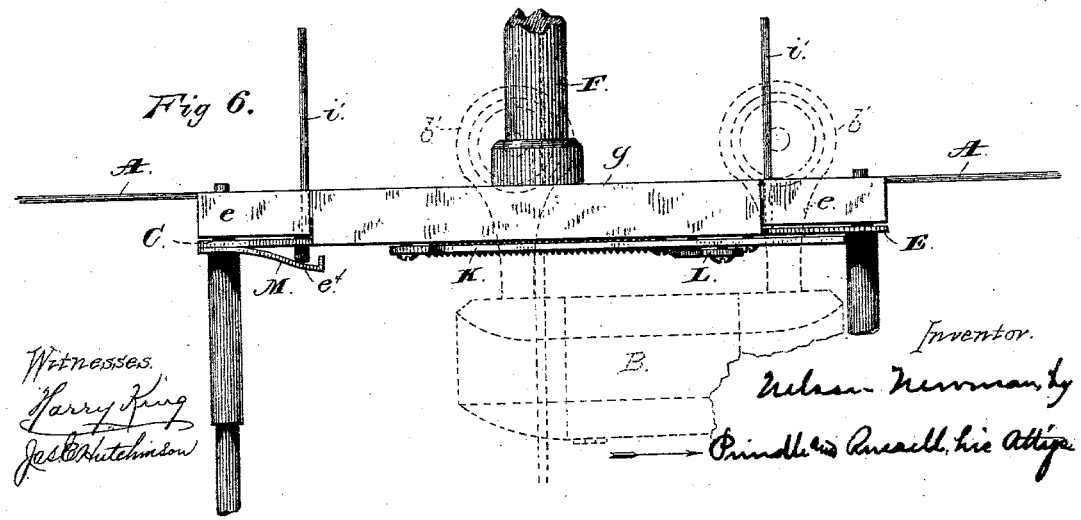

(No Model.) 5 Sheets—Sheet 5.
N. NEWMAN.
CASH CARRIER.
No. 455,349. Patented July 7, 1891.
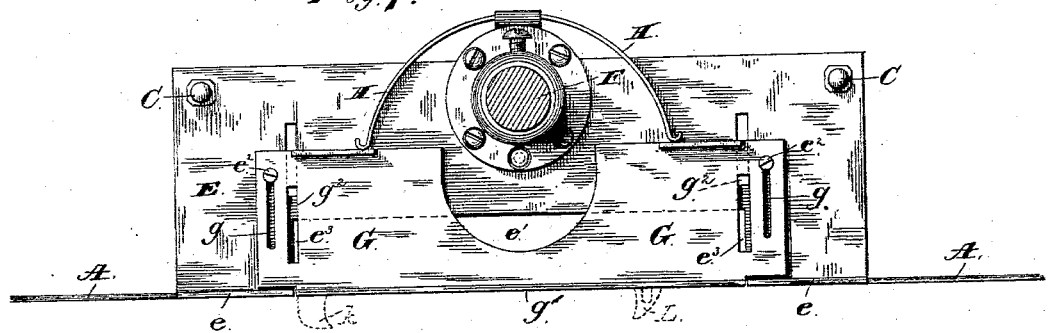
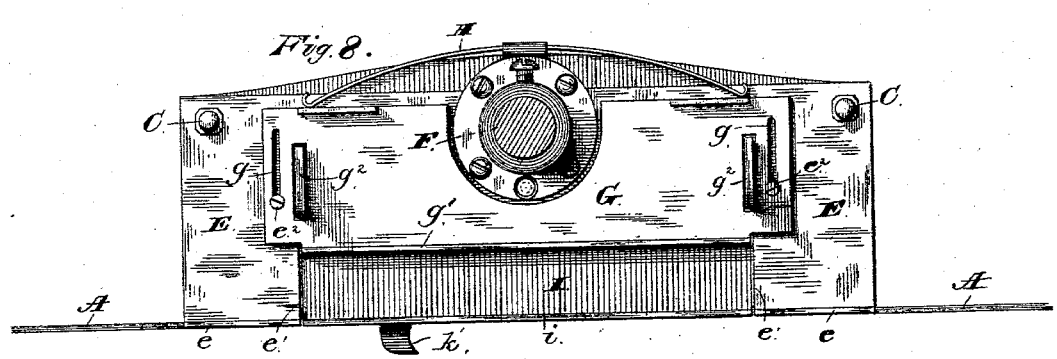
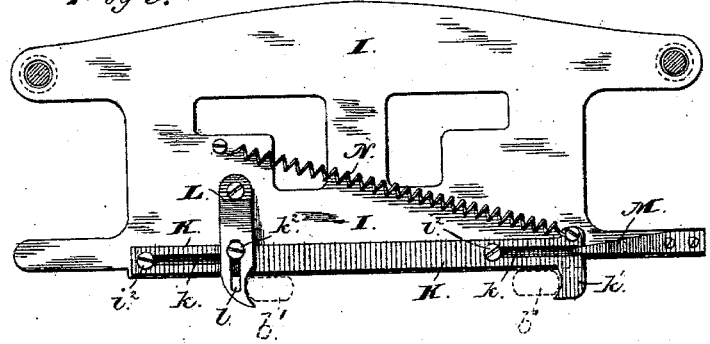
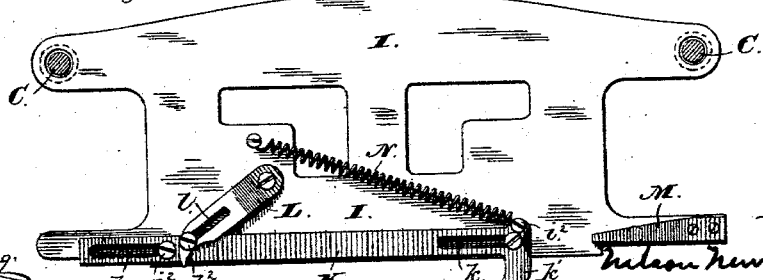

UNITED STATES PATENT OFFICE.

NELSON NEWMAN, OF SPRINGFIELD, ILLINOIS, ASSIGNOR, BY MESNE ASSIGNMENTS, TO THE LAMSON CONSOLIDATED STORE SERVICE COMPANY, OF NEW JERSEY.

CASH-CARRIER.

SPECIFICATION forming part of Letters Patent No. 455,349, dated July 7, 1891.

Application filed March 4, 1886. Serial No. 193,992. (No model.)

*To all whom it may concern:*

Be it known that I, NELSON NEWMAN, of Springfield, in the county of Sangamon, and in the State of Illinois, have invented certain new and useful Improvements in Cash-Carriers; and I do hereby declare that the following is a full, clear, and exact description thereof, reference being had to the accompanying drawings, in which—

Figure 1 is a perspective view of my elevator while being raised with a carrier. Fig. 2 is a like view of the same after said carrier has been raised to position and is about to be moved forward upon the line. Figs. 3 and 4 are end elevations of said elevator and show, respectively, the relative positions of parts seen in Figs. 1 and 2. Figs. 5 and 6 are front elevations of the same and show, respectively, the positions of parts seen in Figs. 1 and 3 and 2 and 4. Fig. 7 is a plan view of the upper side of the shiftable table when occupying its normal position. Fig. 8 is a like view of the same when moved to the rear and replaced in the line by the elevator; and Figs. 9 and 10 are plan views of the lower side of said elevator and show, respectively, the position of the impulse mechanism before and after the same has been released.

Letters of like name and kind refer to like parts in each of the figures.

The design of my invention is to increase the efficiency, to lessen the cost, and to render more easy of operation the class of mechanism commonly known as "cash-carriers;" and to this end my said invention consists in the cash-carrier system, and in the construction, arrangement, and combination of parts thereof, as hereinafter specified.

My improvements are intended for use in connection with a single-track wire A, which is arranged to pass from any desired station to the cashier's desk, having a sufficient inclination to cause a carrier B, suspended upon grooved rollers $b$, to be moved steadily toward the cashier's desk by the force of gravity, the return of the carriers to the station being effected in any desired manner.

At each station there is provided an elevator-frame, which is composed of two vertically-arranged rods C and C, that are connected together at their lower ends by means of a cross-bar D, and at their upper ends are in like manner connected together by a plate E, (shown in plan view in Figs. 7 and 8,) that has at its front edge an upward-turned flange $e$, to which are attached the ends of the wire track A, the arrangement being such that said flange $e$ is a part and forms a continuation of said track. Said plate E is preferably supported by means of a rod F, which extends from its upper central portion near its rear edge to and is secured upon the ceiling of the room.

Within the front of the plate or platform E is a right-angled notch $e'$, which has a length somewhat greater than the length of the carrier B and a width from front to rear substantially equal to about one-fourth its length, and over the same is placed a plate G, that is secured in place thereon by means of two screws $e^2$, one of which passes downward through a transversely-arranged slot $g$, that is provided within each end of said plate, by which arrangement the latter is prevented from being moved longitudinally, while free to move forward and back within the limits of said slots. A spring H, arranged to impinge upon the rear edge of said plate, holds the latter with a yielding pressure at the front limit of its motion. The ends of the plate or shiftable table G (which thus forms a movable section of the track) extend over the ends of the notch $e'$, while its front edge has each corner notched, so as to permit said edge to be moved into line with the front edge of the platform E. The portion of the front edge of said table G which is contained between the sections of the upward-turned flange $e$ of said platform is in like manner provided with an upward-turned flange $g'$, which, when said table occupies its normal position, coincides with said flanges $e$ and forms a movable portion and a continuation of the track A. The pivotal bearings $b'$ of the carrier-rollers $b$ are extended from the carrier B upward, outward, upward, and then inward, so as to leave the lower peripheries of said rollers unobstructed, and enable the latter to be readily placed upon or removed from the track A.

Below the platform E is placed an elevator

I, which at its ends fits loosely around the rods C and C, and is adapted to be moved vertically upon the same. Said elevator consists of a plate of metal, which has the form in plan view shown in Figs. 9 and 10, and at its front edge is provided with an upward-turned flange $i$, that has such length and height as to cause it to fill the space between and form a continuation of the flanges $e$ and $e$ when said elevator is moved to the upper limit of its motion.

In order that the table G may be automatically moved rearward out of way of the elevator I as the latter nears the upper limit of its motion, the former is provided near each end with a slot $g^2$, which extends from near its front edge nearly to its rear edge, and is in a line with a similar slot $e^3$, that is formed in the platform beneath. Said slot $e^3$ is almost wholly in rear of said slot $g^2$ when said table occupies its normal position, the front end of the former and the rear end of the latter being caused to slightly overlap.

Secured to and extending upward from the upper side, near each end of the elevator I, is a flat bar $i'$, which is arranged in a line with and has such thickness as to enable it to pass easily into the slots $e^3$ and $g^2$. The front edge of said bar is vertical; but its rear edge from a point near its lower end to its upper end has an upward and a forward inclination, the result being the production of a pointed or wedge-shaped upper end, thus forming a beveled nose. If now the elevator be moved upward, as it nears the upper limit of its motion its pointed bars $i'$ will enter the slots $e^3$ and $g^2$, when their inclined rear edges will engage with the rear ends of said slots $g^2$ and operate to force the table G rearward out of the way of said elevator. As the latter descends again, said table will resume its former normal position by force of the spring H and render said track again continuous for the passage of carriers from other stations.

The elevator is preferably raised to position by means of a cord, (shown by dotted lines,) which is attached to its upper side and from thence passes upward to and over a pulley, and from thence downward to a convenient point, where it may be grasped by an operator. As thus arranged, if a carrier is placed upon said elevator, as shown in Fig. 1, and the latter then moved to the upper limit of its motion, the movable table will be pressed rearward, and the flange of said elevator, upon which said carrier is suspended, will be moved into position to constitute a portion of the track and permit said carrier to be run upon the same.

In order that the carrier may be held in position upon the elevator while being raised to the track, and then automatically released and sent out upon the latter, the following described mechanism is employed, viz: Upon the lower side, at the front edge of the elevator I, is a bar K, that is provided near each end with a longitudinal slit $k$, through which passes a screw $i^2$, that confines said bar in vertical and transverse position, while permitting it to move freely longitudinally within the limits of said slot. The rear end of the bar K is provided with a lug $k'$, which projects in a slight curve outward and forward, and, when a carrier B is in place upon the elevator I, engages with the rear roller-bearing $b'$ of said carrier. A second short bar L is placed across said bar K and has its rear end pivoted upon said elevator, and its front portion, which is provided with a longitudinal slot $l$, connected with said bar K by means of a screw $k^2$, that passes through said slot into said bar. The outer end of said bar L has a slight outward and rearward curve directly opposite to the curve of said lug $k'$, and is adapted to engage with the front roller bearing $b'$ of a carrier B when the latter is in place upon the elevator I, and said bar K is at the rear limit of its motion. The bar K is held at the rear limit of its motion by means of a spring-pawl M, which is secured to the rear end of the elevator I, and is adapted to engage with the rear end of the contiguous slot $k$, and when released from such engagement said bar is drawn to the front limit of its motion by means of a spring N, that is secured to and extends between its front end and some convenient portion of the front end of said elevator. When the bar K moves to the front limit of its motion the outer end of the short bar L is moved forward and inward until entirely withdrawn beneath the elevator I, as seen in Fig. 10, in which position it presents no obstacle to the free forward movement of a carrier B; but when said bar K is moved to the rear limit of its motion said bar L is thrown outward, as seen in Fig. 9, and in connection with the lug $k'$ operates to lock the carrier in place and prevent it moving off said elevator.

To place a carrier B upon the elevator I, the rollers $b$ of the former are placed upon the track-flange $i$, with the rear bearing $b'$ in the engagement with the lug $k'$, after which, by pressing said carrier rearward with sufficient force to overcome the pressure of the spring N and carry the bars K and L to the positions seen in Fig. 9, said carrier will be locked in place. The carrier B is released, when raised to position to run upon the track A, by means of a stud $e^4$, which projects downward from the platform E, and at its lower end engages with the spring-pawl M just as the elevator I reaches the upper limit of its motion, such engagement operating to throw said pawl out of engagement with the bar K, so as to enable the latter to be drawn forward by the spring N, which movement not only releases the front end of said carrier, but also gives the latter an impulse that sends it out upon the track with considerable velocity. As soon as a carrier leaves an elevator the latter should be dropped to its normal position, where it is ready to receive another carrier and place it upon the track.

Having thus described my invention, what I claim is—

1. In a cash-carrier apparatus, in combination with a track having a movable section, a carrier-elevator, a beveled nose on the elevator for displacing the movable section as the elevator rises, and a spring returning the movable section into place as the elevator descends, as described.

2. In a cash-carrier apparatus, in combination with a track having a movable section, a carrier-elevator provided with a flange to take the place of the movable section when the elevator is raised, a beveled nose on the said elevator, engaging the said movable section and displacing it as the elevator rises, and a spring returning such section to its place in the track, as set forth.

3. In a cash-carrier apparatus, the combination, with a wire track having at each station a horizontally-movable section, a vertically-movable elevator having a flange adapted to fill the place of the track-section and make the track continuous when the elevator is raised, as described.

4. In a cash-carrier apparatus, a track having at each station a gap, in combination with a movable table and an elevator having a flange, which is adapted to alternately fill said gap and make the said track continuous, as set forth.

5. In combination with a track having a gap, a movable table and elevator, each having a flange adapted to fill the gap in the track, a beveled nose in the said elevator engaging the said movable table and displacing it as the elevator rises, and a spring returning said table to its place, as set forth.

6. In a cash-carrier apparatus, the combination of a track having a gap at a station, a movable table having a flange adapted to fill the gap in the track, a spring pressing the table normally into a position to fill the gap in the track, and an elevator provided with beveled noses to engage portions of the table, as described.

7. In a cash-carrier apparatus, the combination of a track having a gap at a station, a movable table having a flange adapted to fill the gap in the track and make said track continuous, and also having two slots, a spring engaging the table, and a carrier-elevator provided with a flange similar to that on the table and with beveled noses to engage the slots in the table, all as set forth.

In testimony that I claim the foregoing I have hereunto set my hand this 22d day of January, 1886.

NELSON NEWMAN.

Witnesses:
GEO. A. SANDERS,
WILLIAM R. BOWERS.